US012673582B2

(12) United States Patent
Diamond

(10) Patent No.: US 12,673,582 B2
(45) Date of Patent: Jul. 7, 2026

(54) PRECONDITIONER SYSTEM FOR A BATTERY OF A VEHICLE AND METHOD

(71) Applicant: Ford Global Technologies, LLC, Dearborn, MI (US)

(72) Inventor: Brendan Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 681 days.

(21) Appl. No.: 18/139,587

(22) Filed: Apr. 26, 2023

(65) Prior Publication Data

US 2024/0359594 A1 Oct. 31, 2024

(51) Int. Cl.
B60L 58/26 (2019.01)
B60L 58/13 (2019.01)
B60L 58/27 (2019.01)

(52) U.S. Cl.
CPC .............. B60L 58/26 (2019.02); B60L 58/13 (2019.02); B60L 58/27 (2019.02); *B60L 2240/34* (2013.01); *B60L 2250/16* (2013.01)

(58) Field of Classification Search
CPC .......... B60L 58/26; B60L 58/13; B60L 58/27; B60L 2240/34; B60L 2250/16; B60L 1/02; B60L 2240/545; B60L 58/24; B60L 53/14; B60L 58/12; B60Q 9/00
See application file for complete search history.

(56) References Cited

U.S. PATENT DOCUMENTS

| | | | |
|---|---|---|---|
| 9,340,121 B2 | 5/2016 | Schwarz et al. | |
| 2002/0121972 A1* | 9/2002 | Schofield .............. | B60S 1/0822 |
| | | | 340/425.5 |
| 2010/0072290 A1* | 3/2010 | Dage .................. | B60H 1/00778 |
| | | | 236/51 |
| 2011/0084852 A1* | 4/2011 | Szczerba ............ | G01C 21/3626 |
| | | | 340/901 |
| 2013/0009765 A1 | 1/2013 | Gilman et al. | |
| 2013/0221741 A1* | 8/2013 | Stanek .................... | B60L 1/003 |
| | | | 903/903 |
| 2016/0288659 A1* | 10/2016 | Hammoud ................ | B60L 1/02 |
| 2018/0345816 A1* | 12/2018 | Sakakibara .............. | B60Q 9/00 |
| 2021/0122257 A1* | 4/2021 | Lee ......................... | B60L 53/62 |
| 2022/0250506 A1 | 8/2022 | Goldman-Shenhar et al. | |
| 2023/0130590 A1* | 4/2023 | Hiyoshi ............. | B60H 1/00278 |
| | | | 62/243 |

* cited by examiner

*Primary Examiner* — Kyle J Kingsland
(74) *Attorney, Agent, or Firm* — Vichit Chea; Price Heneveld LLP

(57) ABSTRACT

A preconditioner system for a battery for a vehicle, the preconditioner system including detecting a state of charge of the battery. The system including determining the state of charge is below a first threshold. The system including prompting a user to connect the battery to a charger and detecting a temperature of the battery. The system including determining the temperature of the battery is outside a targeted battery temperature range and determining the charging capacity of the charger is below a second threshold at the temperature. The system including detecting a condition for a cabin defroster being deactivated and deactivating the cabin defroster in response to determining that the condition for the cabin defroster being deactivated is met. The system changing the temperature of the battery toward the targeted battery temperature range.

11 Claims, 8 Drawing Sheets

PRECONDITIONER SYSTEM FOR A BATTERY OF A VEHICLE AND METHOD

FIELD OF THE DISCLOSURE

The present disclosure generally relates to control of a preconditioner system for a vehicle, and more specifically relates to a preconditioning system and method for an electric vehicle having a battery.

BACKGROUND OF THE DISCLOSURE

Electric motor vehicles are commonly equipped with batteries. Batteries within electric motor vehicles may be at or near the same temperature as the surrounding environment. It would be desirable to control the temperature of a battery to assist with time spent charging the battery.

SUMMARY OF THE DISCLOSURE

According to a first aspect of the present disclosure, a preconditioner system for a battery for a vehicle is provided. The preconditioner system includes detecting a state of charge of the battery. The system includes determining the state of charge is below a first threshold. The system includes prompting a user to connect the battery to a charger and detecting a temperature of the battery. The system includes determining the temperature of the battery is outside a targeted battery temperature range and determining the charging capacity of the charger is below a second threshold at the temperature. The system includes detecting a condition for a cabin defroster being deactivated and deactivating the cabin defroster in response to determining that the condition for the cabin defroster being deactivated is met. The system changing the temperature of the battery toward the targeted battery temperature range.

Embodiments of the first aspect of the present disclosure can include any one or a combination of the following features:

- detecting an outside air temperature and determining whether a measured duration a cabin defroster has been active exceeds a target duration the cabin defroster activates to defrost and deice a window based on the difference between the outside temperature and a targeted cabin temperature;
- detecting a clarity of a window and determining whether the clarity of the window exceeds a clarity threshold;
- detecting the clarity of the window includes measuring the clarity with a camera disposed within a cabin of the vehicle;
- prompting a user to increase an air flow temperature, activate an air conditioner, activate an outside air intake, increase air flow, and direct a side window toward an ajar position in response to the clarity being less than the target clarity;
- prompting a user that preconditioning is recommended and receiving an input from the user to deactivate the cabin defroster;
- the first threshold being determined by a distance between the vehicle and the;
- the first threshold being determined by a decrease of the state of charge;
- activating the preconditioner to increase the temperature of the battery in response to the temperature of the battery being less than the targeted battery temperature range;

- activating the preconditioner to decrease the temperature of the battery in response to the temperature of the battery being greater than the targeted battery temperature range; and
- deactivating the preconditioner in response to the temperature of the battery being within the targeted battery temperature range.

According to a second aspect of the present disclosure, a preconditioner system for a battery of a vehicle is provided. The preconditioner system includes a first temperature sensor configured to measure a temperature of the battery, a heating, ventilation, and air conditioning system configured to direct an air flow toward at least one of a window and the battery. The preconditioner system includes a state of charge sensor configured to measure a state of charge of the battery. The preconditioner system includes a navigation system configured to provide a route to a charger. The preconditioner system includes a controller communicatively coupled with the first temperature sensor, the heating, ventilation, and air conditioning system, the state of charge sensor, and the navigation system. The controller controls whether the air flow is directed toward the window and the battery based on a respective received signal from each of the first temperature sensor, the heating, ventilation, and air conditioning system, the state of charge sensor, and the navigation system.

Embodiments of the second aspect of the present disclosure can include any one or a combination of the following features:

- a second temperature sensor communicatively coupled with the controller, wherein the second temperature sensor measured an outside air temperature;
- a camera directed toward the window, wherein the camera is configured to measure a clarity of the window;
- the heating, ventilation, and air conditioning system directs the air flow toward the window via a cabin defroster;
- a human machine interface, wherein the human machine interface is configured to display at least a first prompt, a second prompt, and third prompt, and receive an input from the user to activate and deactivate the cabin defroster;
- the first prompt prompts the user to connect the battery to the charger;
- the second prompt prompts the user to increase an air flow temperature, activate an air conditioner, activate an outside air intake, increase air flow, and direct a side window toward an ajar position; and
- the third prompt prompts the user to deactivate the cabin defroster.

According to a third aspect of the present disclosure, a method of preconditioning a battery for a vehicle is provided. The method includes the steps of detecting a state of charge of the battery, determining the state of charge of the battery is below a threshold percentage. The method includes the step of prompting a user to connect the battery to a charger, detecting a temperature of the battery in response to the user affirming to connect the battery to the charger, determining the temperature of the battery is outside a targeted battery temperature range, observing a charging capacity of the. The method also includes the step of determining the charging capacity of the charger is below a second threshold at the temperature of the battery and determining whether a measured duration a cabin defroster has been active exceeds a target duration the cabin defroster activates to defrost and deice the window. The method further includes the steps of determining whether a measured clarity exceeds a target clarity of the window, prompting a user to deactivate the cabin defroster in response to the measured duration exceeding the target duration and the measured clarity exceeding the target clarity, deactivating the cabin defroster in response to the user providing an input to deactivate the cabin defroster, and activating a preconditioner to change the temperature of the battery toward the targeted battery temperature range.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 1 is a side perspective view of an electric vehicle connected with a;

FIG. 41B is the flow diagram of FIG. 4A including basing the preconditioning of the battery on a user input;

DETAILED DESCRIPTION OF PREFERRED EMBODIMENTS

Figure 1:
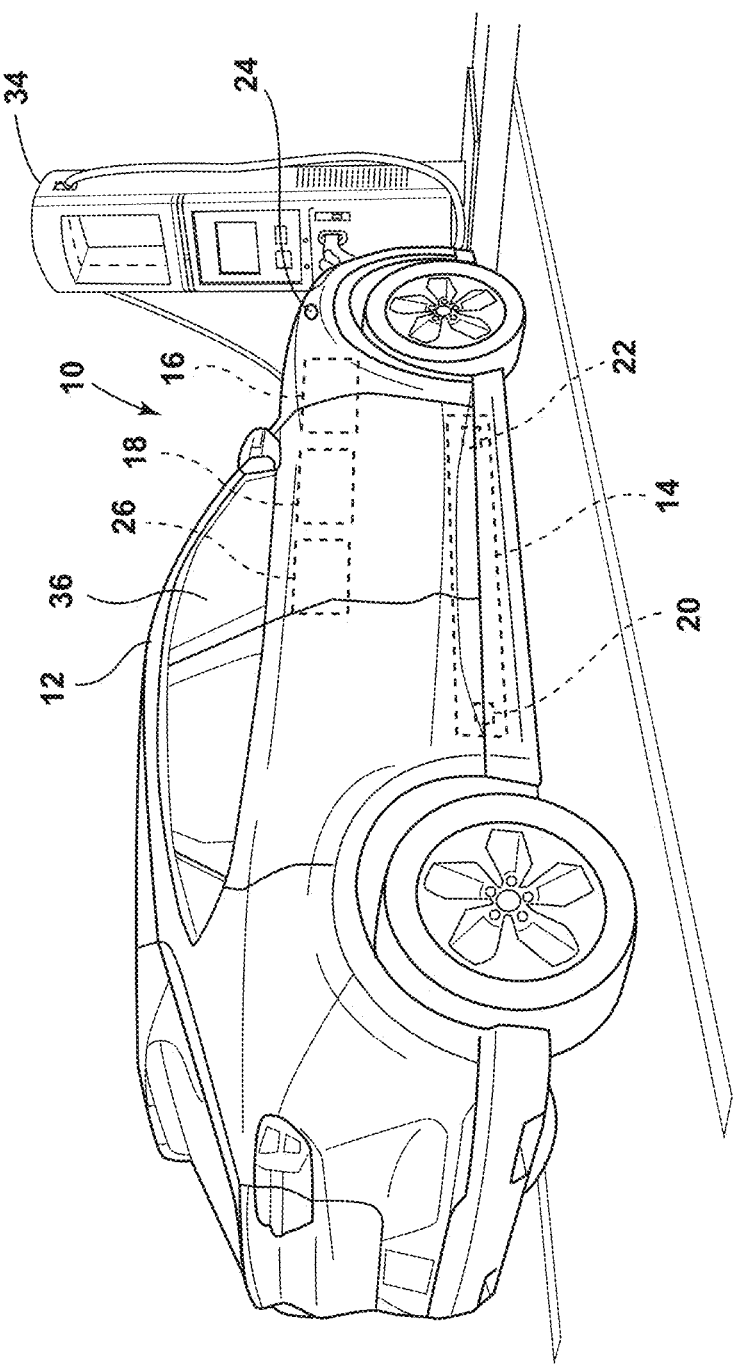

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims.

Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a preconditioning system and method of preconditioning a battery in a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1-6, reference numeral 10 generally refers to a preconditioner system. The preconditioner system 10 is for a vehicle 12. More specifically, the preconditioner system 10 is for an electric vehicle having a battery 14. The preconditioner system 10 includes a controller 16 configured to control the preconditioner system 10. The preconditioner system 10 includes state of charge sensor 20 communicatively coupled with the controller 16. The state of charge sensor 20 is configured to detect a state of charge of the battery 14. The preconditioner system 10 includes a navigation system 26 communicatively coupled with the controller 16. The navigation system 26 is configured to provide a route to a user to direct the user in the vehicle 12 toward a charger (for example, a direct-current fast charger, an AC charger) 34. The preconditioning system 10 may activate only based on the navigation system 26 proving the route to the user. The preconditioner system 10 includes a heating, ventilation, and air conditioning system (HVAC) 18 communicatively coupled with the controller 16. The HVAC system 18 directs an air flow 42 toward the battery 14 and a window 36. The HVAC system 18 is considered to be the preconditioner as it preconditions the battery 14 when it directs the air flow 42 toward the battery 14. The preconditioner system includes a first temperature sensor 22 communicatively coupled with the controller 16. The first temperature sensor 22 is configured to detect a temperature of the battery 14. The preconditioner system 10 may also include a second temperature sensor 24 communicatively coupled with the controller 16. The second temperature sensor 24 is configured to detect an outside air temperature. The preconditioner system 10 includes a cabin defroster 28 fluidly coupled with the HVAC system 18.

With further reference to FIGS. 1-6, the temperature of the battery 14 can be changed via directing coolant from the HVAC system 18, hot oil from other vehicle components (e.g., powertrain, motor, or other internal component) to the battery 14 or, for example, to a heat exchanger which contains coolant for the battery 14.

Figures 2A, 2B:
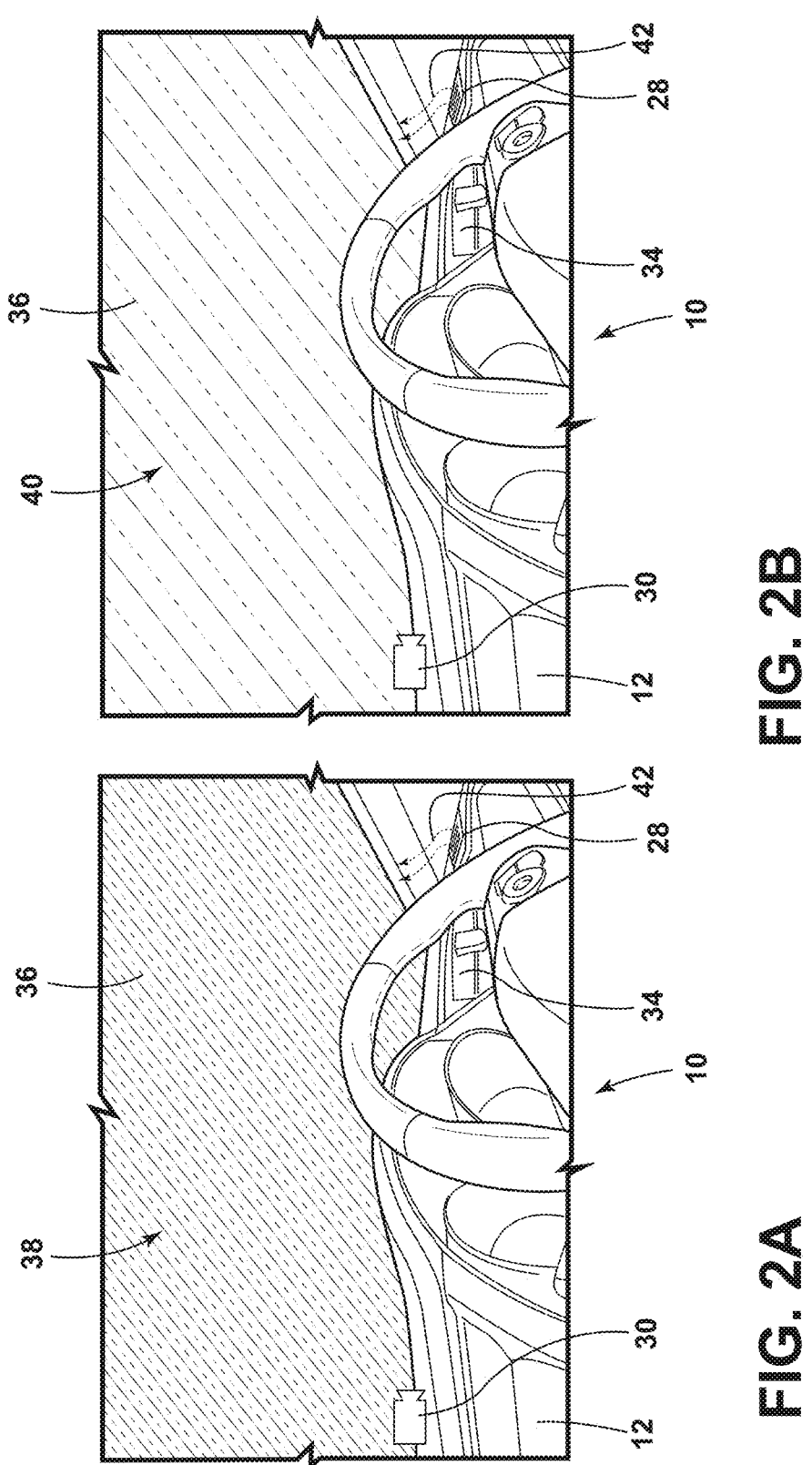
FIG. 2A is a side perspective view of a window at a current clarity from within a cabin of the vehicle.
FIG. 2B is a side perspective view of a window at a target clarity from within a cabin of the vehicle.

Referring to FIGS. 2A and 2B, the preconditioner system may also include a camera 30 configured to capture images on the interior side of the window 36 which are image processed to measure a clarity 38 of the window 36. For example, the camera 30 may be a transmittance sensor, a digital camera, an analog camera, a photometer, or other light sensor. The camera 30 may measure clarity 38 by collecting image data. The camera 30 is also communicatively coupled with the controller 16, which may include process circuitry to perform image processing. The camera 30 may be configured to capture images used to measure clarity 38 by detecting a transmittance of the window 36. Additionally, or alternatively, the camera 30 may be configured to collect images of the window 36.

With further reference to FIGS. 2A and 2B, the preconditioner system 10 includes a human machine interface (HMI) 32. The IMI 32 is communicatively coupled with the controller 16. The HMI 32 may include a touch screen display that is configured to display a plurality of prompts. The HMI 32 is further configured to receive an input from the user regarding control of the preconditioner system 10.

The clarity 38 shown depicts a measured clarity below a targeted clarity 40. The targeted clarity 40 may correspond with the third threshold 56.

With further reference to FIGS. 1-6, the preconditioner system 10 is configured to assist charging capacity for the battery 14. The controller 16 may include control circuitry, such as a memory 44 and a microprocessor 46, for example. It should be appreciated that the controller 16 may be comprised of analog and/or digital control circuitry. The microprocessor 46 may process the data stored in the memory 44 and execute one or more routines 100, 200, 300. The memory 44 is configured to store at least a first threshold 50. The first threshold 50 may be a predetermined state of charge percentage of the battery 14. Additionally, or alternatively, the controller 16 may compute the first threshold 50 based on the provided route from the navigation system 26. For example, the provided route that is 1 mile in distance would correspond to the first threshold 50 being lower than the provided route that is 2 miles in distance.

Figure 6:
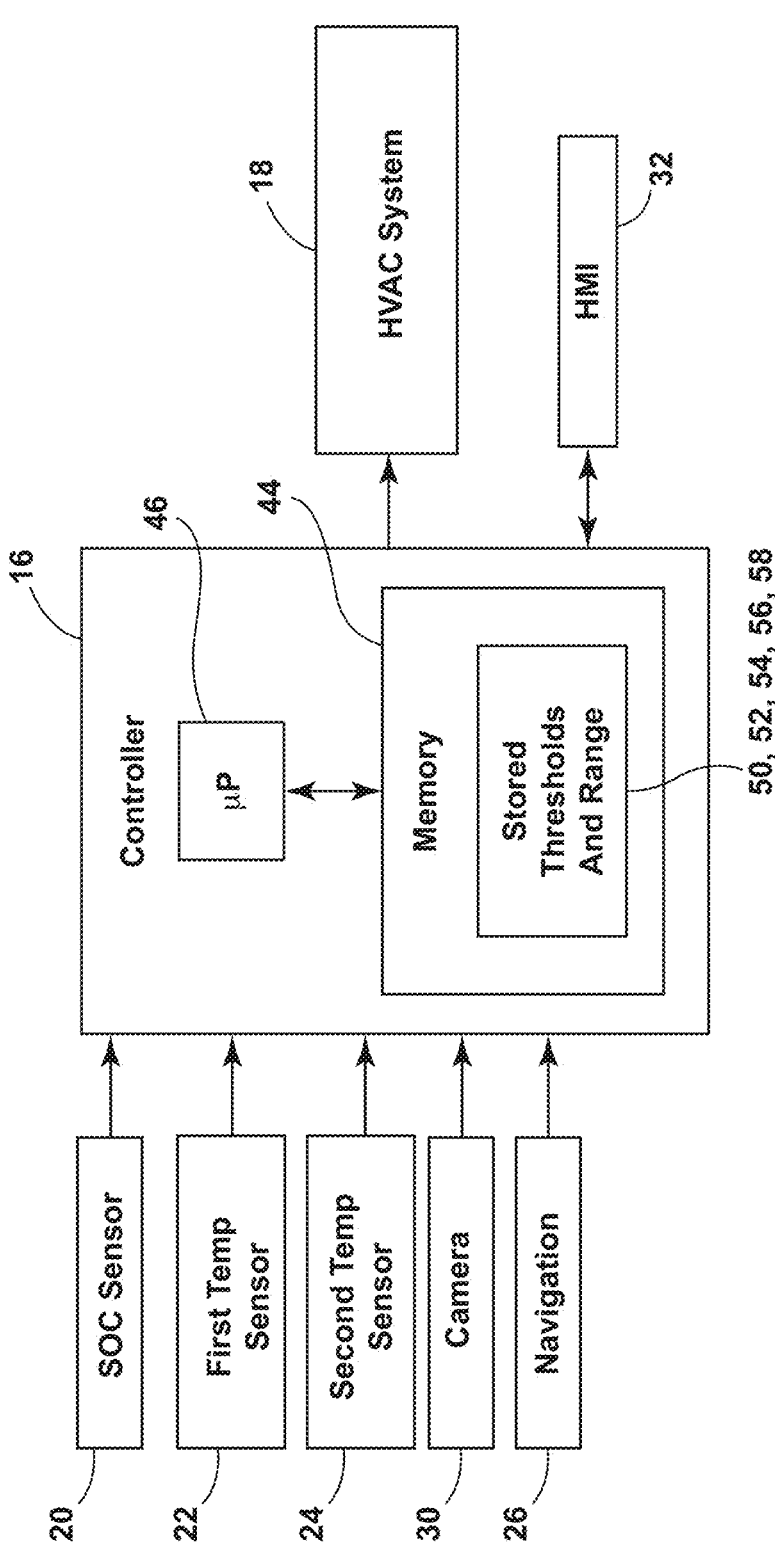
FIG. 6 is a block diagram of the vehicle having a controller configured to control the preconditioning system.

With further reference to FIG. 6, The memory 44 is also configured to store a targeted battery temperature range 52. The targeted battery temperature range 52 may be between about 30° Celsius and about 40° Celsius, for example. According to a more specific example, the targeted battery temperature range 52 may be between about 310 Celsius and about 390 Celsius. The targeted battery temperature range 52 may be between about 32° Celsius and about 38° Celsius. The targeted battery temperature range 52 may be between about 33° Celsius and about 370 Celsius. The targeted battery temperature range 52 may be between about 34° Celsius and about 360 Celsius.

With further reference to FIG. 6, the memory 44 is configured to store a second threshold 54. The second threshold 54 may be a targeted charge rate of the battery that is connected to the charger 34. For example, the charge rate may be measured in watts. The memory 44 may also be configured to store a third threshold 56. The third threshold 56 may be image data that corresponds to a fogless-iceless window. Additionally, or alternatively, the third threshold 56 may be a target transmittance.

With reference to FIGS. 3-5B, the controller 16 computes a fourth threshold 58. The fourth threshold 58 is a duration threshold. The duration threshold is based on a targeted cabin defroster temperature set by the user and the outside air temperature sensed by the first temperature sensor 22. For example, the fourth threshold 58 may be calculated using thermodynamic laws of heating and cooling an object where all variables may be constant except the targeted cabin defroster temperature and the outside air temperature. The navigation system 26 is also configured to receive charger capability data from the charger 34. The controller 16 is configured to calculate a system max charge rate based on the charger capability data of the charger 34 at the temperature detected by the first temperature sensor 22. The controller 16 determines that the temperature of the battery 14 may be changed if the system max charge rate would be below the second threshold 54.

Figure 3:
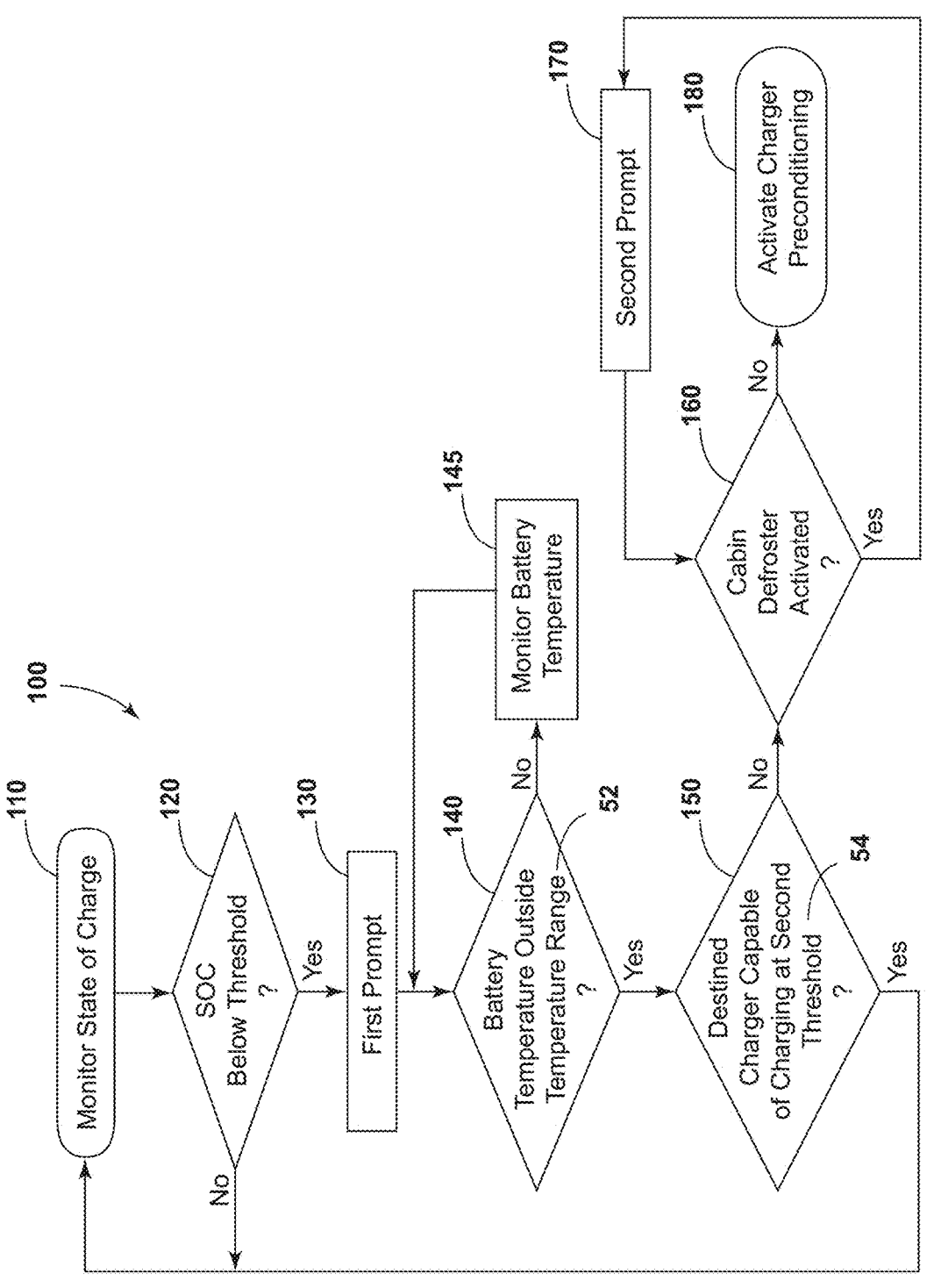
FIG. 3 is a flow diagram illustrating a routine for preconditioning a battery of the vehicle based on a user input.

With reference to FIG. 3, routine 100 includes step 110 of monitoring the state of charge of the battery 14. According to step 120, if the state of charge of the battery 14 is below the first threshold 50, step 130 will commence. If the state of charge of the battery 14 is at or above the first threshold 50, step 110 will commence. According to step 130, the HMI 32 displays a first prompt. The first prompt prompts the user to connect the battery 14 to the charger 34. Additionally, or alternatively, the user may choose the charger 34 among a plurality of chargers. Not shown in FIG. 3, is that the user would input that the user will connect the battery 14 to the charger 34. This input is signal is communicated with the controller 16 and the navigation system 26. Routine 100 then proceeds to step 140. According to step 140, the controller 16 compares the detected temperature of the battery 14 from the first temperature sensor 22 with the targeted battery temperature range stored in the memory 44. If the detected temperature of the battery 14 is outside of the targeted temperature range, step 150 commences. If the detected temperature of the battery 14 is within the targeted temperature range, step 145 commences. According to step 145, the first temperature sensor 22 continues to monitor the temperature of the battery 14. After step 145, step 140 recommences. According to step 150, the navigation system 26 provides the charging capability of the charger 34. If the charger 34 is not capable of charging the battery at the second threshold 54 or higher, step 160 commences. According to step 160, the controller 16 determines whether the HVAC system 18 is directing the air flow 42 through the cabin defroster 28. If the HVAC system 18 is directing the air flow 42 through the cabin defroster 28, step 170 commences. If the HVAC system 18 is not directing the air flow 42 through the cabin defroster 28, step 180 commences. According to step 170, the HMI 32 displays a second prompt. The second prompt prompts the user to increase the temperature of the air flow 42 from the cabin defroster 28, activate an air conditioning function of the HVAC system 18, activate an outside air intake, increase the air flow 42 from the cabin defroster, and direct the window 30 that is a side window toward an ajar position. After step 170, step 160 recommences. According to step 180, the controller 16 communicates with the HVAC system 18 to precondition the battery 14.

Figure 4A:
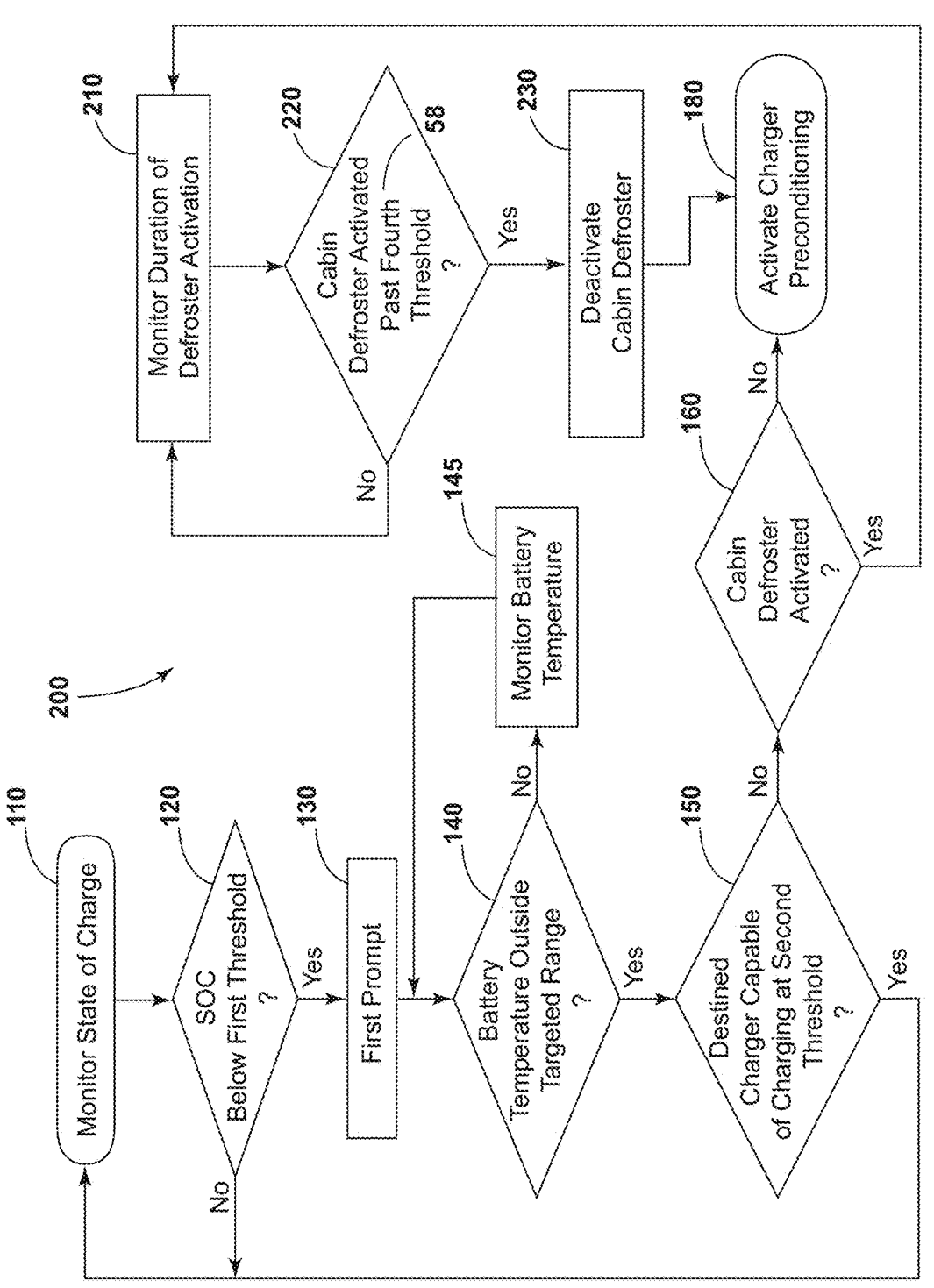
FIG. 4A is a flow diagram illustrating a routine for preconditioning the battery based on time.
Figure 4B:
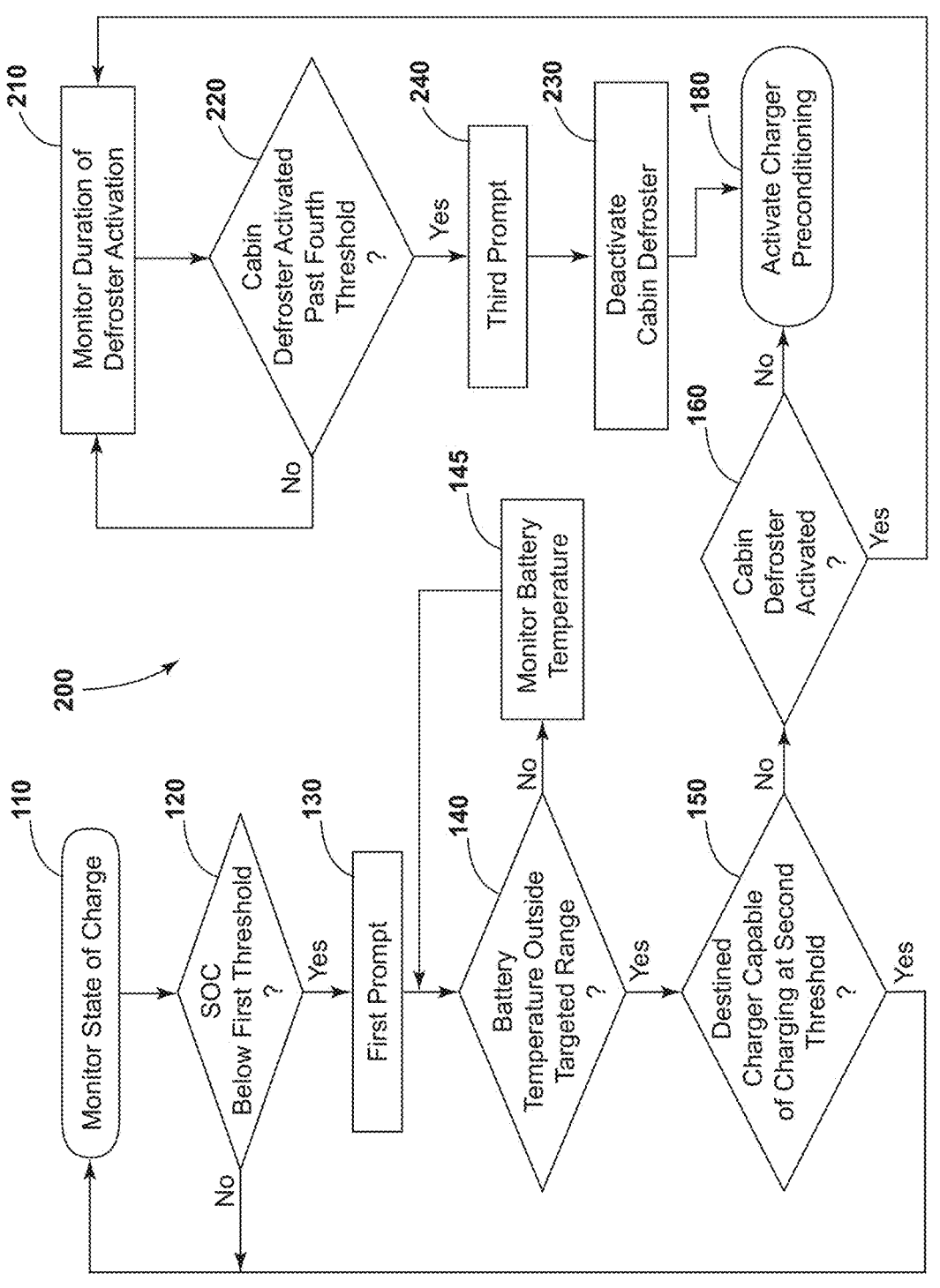

With reference to FIGS. 4A and 4B, routine 200 is shown. Routine 200 contains steps 110, 120, 130, 140, 145, 150, 160, and 180, as shown and described in FIG. 3. Routine 200 commences step 210 if step 160 is answered affirmatively. According to step 210, the controller 16 monitors a duration that the cabin defroster 28 is active. In step 220, the controller 16 compares the duration to the fourth threshold. If the duration exceeds the fourth threshold 58, step 230 commences. According to step 230, the controller 16 deactivates the cabin defroster 28. Following step 230, step 180 commences. Additionally, or alternatively, routine 200 may include step 240. According to step 240, the HMI 32 displays a third prompt after step 220 prompting the user that preconditioning of the battery 14 is recommended and to deactivate the cabin defroster 28. Step 230 commences after step 240.

Figure 5A:
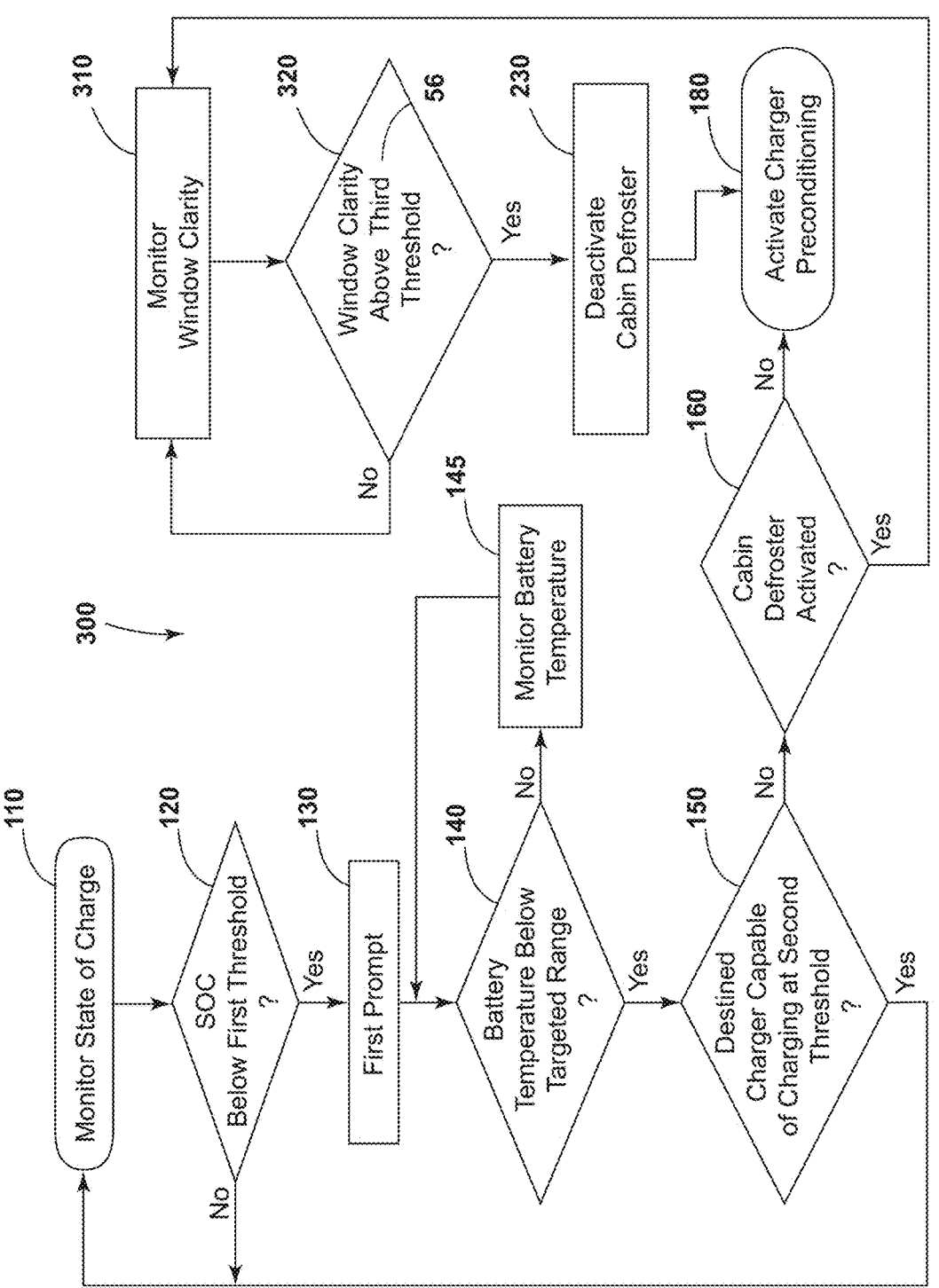
FIG. 5A is a flow diagram illustrating a routine for preconditioning the battery based on a clarity of the window.
Figure 5B:
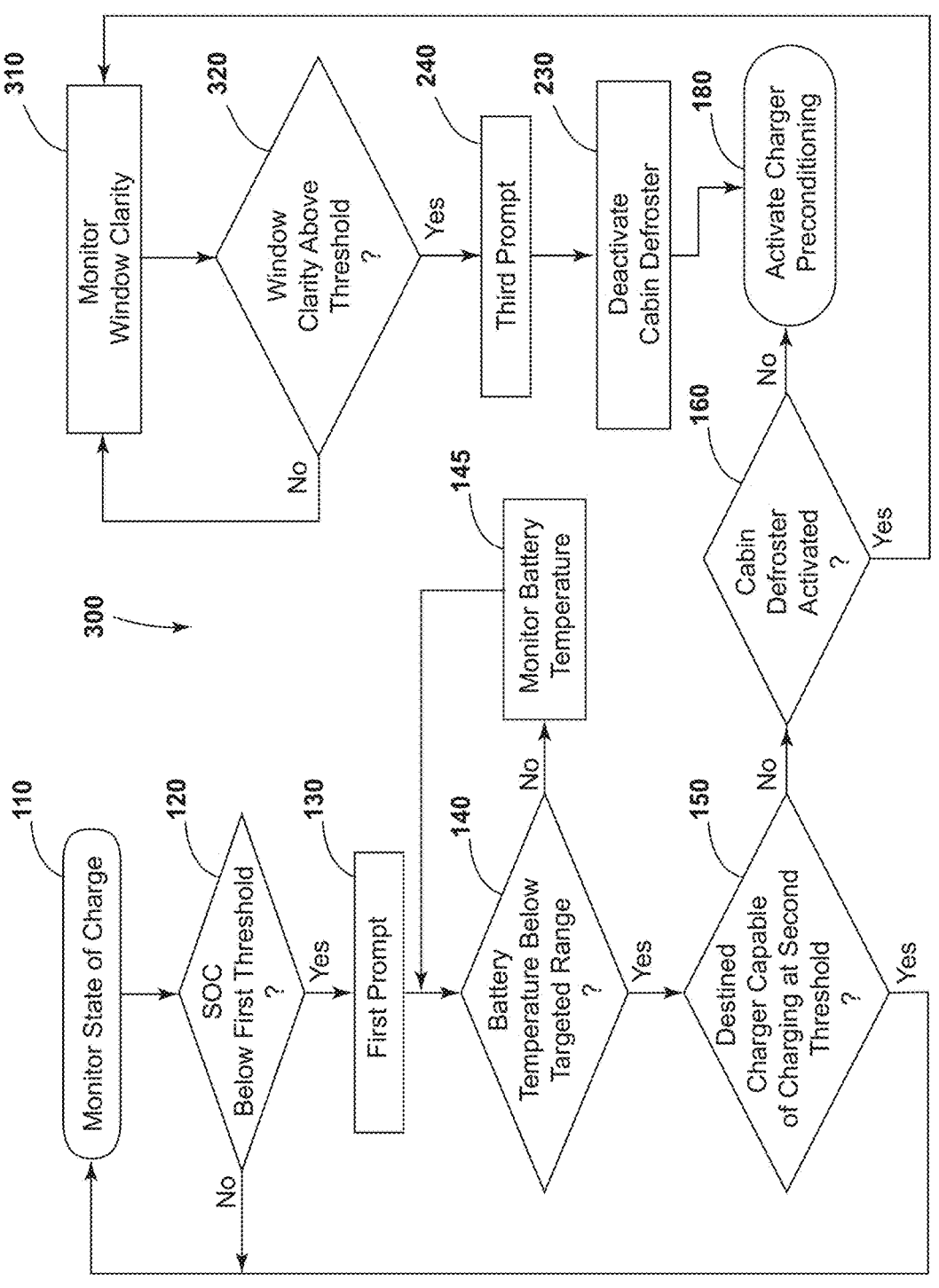
FIG. 5B is the flow diagram of FIG. 5A including basing the preconditioning of the battery on the user input.

With reference to FIGS. 5A and 5B, routine 300 is shown. Routine 300 contains the same steps 110, 120, 130, 140, 145, 150, 160, 180, and 230, as shown and described in FIGS. 4A and 4B. Routine 300 commences step 310 if step 160 is answered affirmatively. According to step 310, the camera 30 monitors the clarity of the window 36. In step 320, the controller 16 determines whether the clarity is above the third threshold 56. After step 320, steps 230 and 180 follow in order. Additionally, or alternately, routine 300 may include step 240. Step 230 commences following step 240 in routine 300. It should be appropriated that routines 100, 200, and 300 may be conducted in series, in sequence, in combination, or exclusively.

Advantageously, the preconditioner system assists in charging the battery of the vehicle. The preconditioner system assists in reducing time spent with the vehicle and the battery connected with the charger when the outside air temperature is outside of the targeted battery temperature range. Additionally, the preconditioner system assists in reducing time spent with the vehicle and the battery connected with the charger when the temperature of the battery is outside of the targeted battery temperature range.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method of preconditioning a battery for a vehicle, the method comprising:

detecting a state of charge of the battery;

determining the state of charge is below a first threshold;

prompting a user to connect the battery to a charger;

detecting a temperature of the battery;

determining the temperature of the battery is outside a targeted battery temperature range;

determining a charging capacity of the charger is below a second threshold at the temperature;

detecting a condition for a cabin defroster being deactivated;

deactivating the cabin defroster in response to determining that the condition for the cabin defroster being deactivated is met;

activating a preconditioner to change the temperature of the battery toward the targeted battery temperature range; and prompting a user that preconditioning is recommended and receiving an input from the user to deactivate the cabin defroster.

2. The method of claim 1, further comprising a step of detecting an outside air temperature and determining whether a measured duration a cabin defroster has been active exceeds a target duration the cabin defroster activates to defrost and deice a window based on a difference between the outside temperature and a targeted cabin temperature.

3. The method of claim 1, further comprising a step of detecting a clarity of a window and determining whether the clarity of the window exceeds a clarity threshold.

4. The method of claim 3, wherein the step of detecting the clarity of the window includes measuring the clarity with a camera disposed within a cabin of the vehicle.

5. The method of claim 1, further comprising a step of the first threshold being determined by a distance between the vehicle and the charger.

6. The method of claim 1, further comprising a step of the first threshold being determined by a decrease of the state of charge.

7. The method of claim 1, further comprising a step of activating the preconditioner to increase the temperature of the battery in response to the temperature of the battery being less than the targeted battery temperature range.

8. The method of claim 1, further comprising a step of activating the preconditioner to decrease the temperature of the battery in response to the temperature of the battery being greater than the targeted battery temperature range.

9. The method of claim 1, further comprising a step of deactivating the preconditioner in response to the temperature of the battery being within the targeted battery temperature range.

10. A method of preconditioning a battery for a vehicle, the method comprising:

detecting a state of charge of the battery;

determining the state of charge is below a first threshold;

prompting a user to connect the battery to a charger;

detecting a temperature of the battery;

determining the temperature of the battery is outside a targeted battery temperature range;

determining a charging capacity of the charger is below a second threshold at the temperature;

detecting a condition for a cabin defroster being deactivated;

deactivating the cabin defroster in response to determining that the condition for the cabin defroster being deactivated is met;

activating a preconditioner to change the temperature of the battery toward the targeted battery temperature range;

detecting a clarity of a window and determining whether the clarity of the window exceeds a clarity threshold; and prompting a user to:

increase an air flow temperature;

activate an air conditioner;

activate an outside air intake;

increase air flow; and direct a side window toward an ajar position in response to the clarity being less than the clarity threshold.

11. A method of preconditioning a battery for an electric vehicle, the method comprising:

detecting a state of charge of the battery;

determining the state of charge of the battery is below a threshold percentage;

prompting a user to connect the battery to a charger;

detecting a temperature of the battery in response to the user affirming to connect the battery to the charger;

determining the temperature of the battery is outside a targeted battery temperature range;

observing a charging capacity of the charger;

determining the charging capacity of the charger is below a second threshold at the temperature of the battery;

determining whether a measured duration a cabin defroster has been active exceeds a target duration the cabin defroster activates to defrost and deice a window;

determining whether a measured clarity exceeds a target clarity of the window;

prompting a user that preconditioning is recommended and to deactivate the cabin defroster in response to the measured duration exceeding the target duration and the measured clarity exceeding the target clarity;

deactivating the cabin defroster in response to the user providing an input to deactivate the cabin defroster; and activating a preconditioner to change the temperature of the battery toward the targeted battery temperature range.

* * * * *